(12) United States Patent
Chan et al.

(10) Patent No.: US 11,128,904 B2
(45) Date of Patent: Sep. 21, 2021

(54) SYSTEM AND METHOD FOR RECOMMENDING MULTIMEDIA DATA

(71) Applicant: DELTA ELECTRONICS, INC., Taoyuan (TW)

(72) Inventors: Shih-Han Chan, Taoyuan (TW); Chao-Hsuan Ko, Taoyuan (TW); Guo-Cheng Lan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 59 days.

(21) Appl. No.: 16/531,109

(22) Filed: Aug. 4, 2019

(65) Prior Publication Data
US 2020/0084487 A1 Mar. 12, 2020

Related U.S. Application Data

(60) Provisional application No. 62/728,082, filed on Sep. 7, 2018.

(30) Foreign Application Priority Data

Apr. 3, 2019 (CN) .......................... 201910266133.6

(51) Int. Cl.
*H04N 21/25* (2011.01)
*H04N 21/466* (2011.01)
*G06Q 50/20* (2012.01)

(52) U.S. Cl.
CPC ......... *H04N 21/251* (2013.01); *G06Q 50/205* (2013.01); *H04N 21/4667* (2013.01); *H04N 21/4668* (2013.01)

(58) Field of Classification Search
CPC ............. H04N 21/251; H04N 21/4667; H04N 21/4668; G06F 16/483; G06F 16/4393;
(Continued)

(56) References Cited

U.S. PATENT DOCUMENTS 6,751,354 B2 6/2004 Foote et al.
6,884,074 B2 4/2005 Theilmann
(Continued)

FOREIGN PATENT DOCUMENTS

CN 101604324 A 12/2009
CN 102822882 A 12/2012
(Continued)

OTHER PUBLICATIONS

Sheng-syun Shen, Hung-yi Lee, Shang-wen Li, Victor Zue and Lin-shan Lee, "Structuring Lectures in Massive Open Online Courses (MOOCs) for Efficient Learning by Linking Similar Sections and Predicting Prerequisites", the 16th Annual Conference of the International Speech Communication Association (INTERSPEECH'15), Dresden, Germany, Sep. 6-10, 2015, p. 1363-1367.

*Primary Examiner* — Anthony Bantamoi
(74) *Attorney, Agent, or Firm* — CKC & Partners Co., LLC

(57) ABSTRACT

A system for recommending multimedia data includes a storage device and a processor. The storage device includes a first storage unit and a second storage unit. The first storage unit is configured to store multimedia data segments. The second storage unit is connected to at least one client device through network, and configured to store operation data generated by the interaction between the at least one client device and the system. The processor coupled to the storage device is configured to analyze the multimedia data segments in the first storage unit in order to generate relevance links between the multimedia data segments, analyze the operation data in the second storage unit, and to generate, based on the relevance links and the operation data, a corresponding recommended list, wherein the recommended list records the multimedia data segments.

12 Claims, 4 Drawing Sheets

(58) Field of Classification Search
CPC ...... G06F 16/435; G06F 16/735; G06F 16/71; G06F 16/41; G06F 16/45
See application file for complete search history.

(56) References Cited

U.S. PATENT DOCUMENTS

| | | | |
|---|---|---|---|
| 7,242,809 | B2 | 7/2007 | Hunter et al. |
| 9,542,649 | B2 | 1/2017 | Su |
| 2002/0078441 | A1* | 6/2002 | Drake ............... H04N 7/16 |
| 2008/0226173 | A1 | 9/2008 | Yuan et al. |
| 2011/0177480 | A1 | 7/2011 | Menon et al. |
| 2012/0173577 | A1 | 7/2012 | Millar et al. |
| 2013/0259399 | A1* | 10/2013 | Ho ..................... G06K 9/36 |
| 2013/0343597 | A1 | 12/2013 | Kocks et al. |
| 2014/0024009 | A1 | 1/2014 | Nealon et al. |
| 2014/0279727 | A1 | 9/2014 | Baraniuk et al. |
| 2015/0058336 | A1 | 2/2015 | Davis et al. |
| 2015/0206441 | A1 | 7/2015 | Brown et al. |
| 2017/0171264 | A1* | 6/2017 | Salomons ........... H04L 65/4069 |

FOREIGN PATENT DOCUMENTS

| | | |
|---|---|---|
| CN | 107766484 A | 3/2018 |
| EP | 2763421 A1 | 8/2014 |
| JP | 07-311539 A | 11/1995 |
| JP | 2002-041823 A | 2/2002 |
| JP | 2002-341735 A | 11/2002 |
| JP | 2005-321662 A | 11/2005 |
| JP | 2008-535017 A | 8/2008 |
| JP | 2013-142718 A | 7/2013 |
| JP | 2014-178358 A | 9/2014 |
| JP | 2015-201185 A | 11/2015 |
| SG | 2013049770 A | 1/2015 |
| TW | 200923860 A | 6/2009 |
| TW | I581115 B | 5/2017 |

* cited by examiner

SYSTEM AND METHOD FOR RECOMMENDING MULTIMEDIA DATA

CROSS-REFERENCE TO RELATED APPLICATION

This application claims priority to U.S. Provisional Application Ser. No. 62/728,082, filed Sep. 7, 2018 and China Application Serial Number 201910266133.6, filed Apr. 3, 2019, which are herein incorporated by reference.

BACKGROUND

Technical Field

The present disclosure relates to a system and a method for recommending multimedia data. More particularly, the present disclosure relates to the system and the method for recommending multimedia data, based on the habit and the preference of users.

Description of Related Art

Along with the development of distance teaching, the space limit is broken through, and users can select a mode, such as a television broadcast or the internet, to learn according to their own preference and convenience. However, the course data are various, and it is not easy for users to know quickly the course data which are suitable for them. The common arranging method of learning list includes a specific default sequence, set by the system, according to topics or the manager. Users cannot determine whether the current course is suitable for the users' current preference and needs.

The multimedia data are multifarious. The favorite category, topic, mode and teaching method of each one is different. The acceptance of different people to the same course is also different. The course data should fit the preference of users so that a good learning result is made.

SUMMARY

One of the embodiments in the present disclosure provides a system for recommending multimedia data. The system includes a storage device and a processor. The storage device includes a first storage unit and a second storage unit. The first storage unit is configured to store a plurality of multimedia data segments. The second storage unit is connected to at least one client device through network, and configured to store a plurality of operation data generated by the interaction between the at least one client device and the system. The processor is coupled to the storage device, and configured to analyze the plurality of multimedia data segments in the first storage unit in order to generate a plurality of relevance links between the plurality of multimedia data segments, the processor being configured to analyze the plurality of operation data in the second storage unit, and being configured to generate, based on the plurality of relevance links and the plurality of operation data, a corresponding recommended list, wherein the recommended list records the plurality of multimedia data segments.

Another one embodiments in the present disclosure provides a method for recommending multimedia data. The method includes the operation: storing, by a first storage unit, a plurality of multimedia data segments; storing, by a second storage unit, operation data generated by the interaction between at least one client device and a multimedia data system, analyzing a plurality of relevance links between the plurality of multimedia data segments in the first storage unit, and analyzing the operation data in the second storage unit, and generating, based on the plurality of relevance links and the operation data, a corresponding recommended list, wherein the recommended list records the plurality of multimedia data segments.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The terms "comprise," "comprising," "include," "including," "has," "having," etc. used in this specification are open-ended and mean "comprises but not limited." In addition, as used herein, the term "and/or" includes any and all combinations of one or more of the associated listed items.

In this specification, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
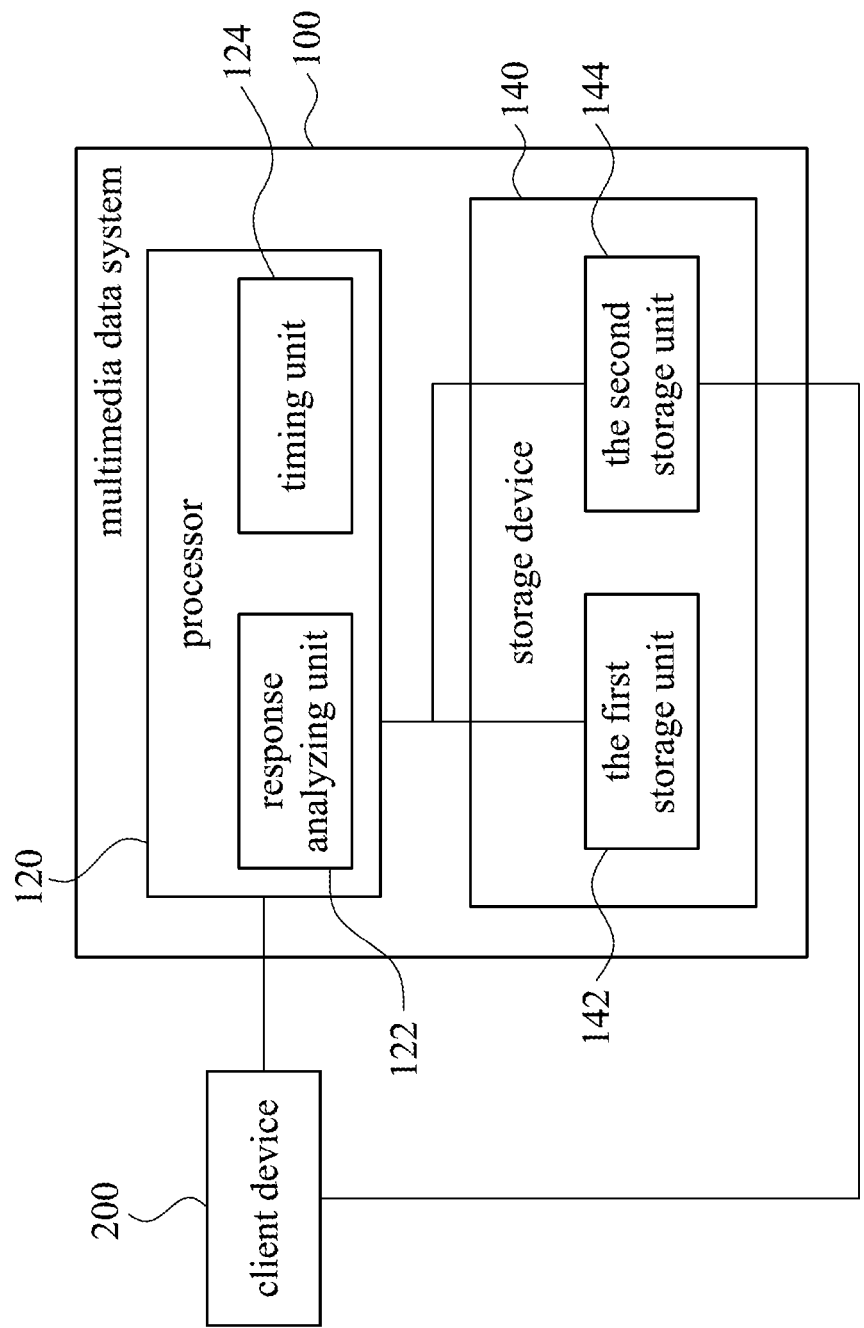
FIG. 1 is a function block diagram of a multimedia data system, in accordance with some embodiments of the present disclosure.

Reference is now made to FIG. 1. FIG. 1 is a function block diagram of a multimedia data system 100, in accordance with some embodiments of the present disclosure. The multimedia data system 100 is in communication connection with the client device 200 and can be mutually connected in a wired or wireless communication manner so as to achieve the purpose of transferring data. In some embodiments, the multimedia data system 100 can be an English online learning platform. The client device 200 can be a personal desktop computer, a laptop device, a tablet device, an intelligent mobile communication device, and the like. The multimedia data can be online courses including videos, articles, audio files, projection movies, or other media with learning data.

In some embodiments, the multimedia data system 100 includes a processor 120 and a storage device 140. The processor 120 and the storage device 140 are in communication connection with the client device 200. The processor 120 is configured to transmit data to the client device 200, and store the data in the storage device 140 or read the data from the storage device 140. In some embodiments, the processor 120 can be a central processor, a microprocessor, or other components having a data processing function. The storage device 140 can be a hard disk, a magnetic disk array, a tape drive, a non-volatile memory or other electronic storage media.

In some embodiments, the operation data include at least one response to the multimedia data segments. The processor 120 includes a response analyzing unit 122 and a timing unit 124. The response analyzing unit 122 is configured to perform analyzing in order to obtain at least one response corresponding to at least one question in the multimedia data segments. For example, the user's answer to the online test of the English teaching video is obtained. The timing unit 124 is configured to calculate a lay duration of the multimedia data segments, for example, the play duration of one English teaching video which the user is watching.

In some embodiments, the storage device 140 includes a first storage unit 142 and a second storage unit 144. The client device 200 is in communication connection with the second storage unit 144. The second storage unit 144 is configured to store data corresponding to the client device 200. The first storage unit 142 is configured to store multimedia data segments. The second storage unit 144 is configured to store operation data generated by the interaction between the client device 200 and the multimedia data system 100, such as log or diary. The processor 120 is configured to analyze and compute the multimedia data segments stored in the first storage unit 142 and the operation data, and to generate a corresponding recommended list data for the client device 200 to display the recommended list.

In some embodiments, the storage device 140 further includes a third storage unit (not illustrated in the figure). The third storage unit is configured to store meta data corresponding to the multimedia data segments (e.g., the actual video mp4 files and video files) in the first storage unit 142, in which the multimedia data segments have been uploaded to a cloud platform database in the multimedia data system 100. In some embodiments, the third storage unit can be integrated with any one of the first storage unit 142 and the second storage unit 144, but the present disclosure is not limited thereto.

In some embodiments, the first storage unit 142 can be a course database for storing online courses. The second storage unit 144 can be a back-end database for storing operation data of the personal desktop computer over the English online learning platform. The operation data is, for example, that when a user clicks, by a mouse, an online course data wanted to be watched, and the back-end database stores the clicked items as the operation data.

It should be noted that the implementation way of the devices and the components in the multimedia data system 100 described above is not limited by the disclosed embodiments, and the connection relation is not limited by the embodiments above. The connection way and the implementation way which are sufficient to enable the multimedia data system 100 to realize the following technical contents can be applied to the present disclosure.

Figure 2:
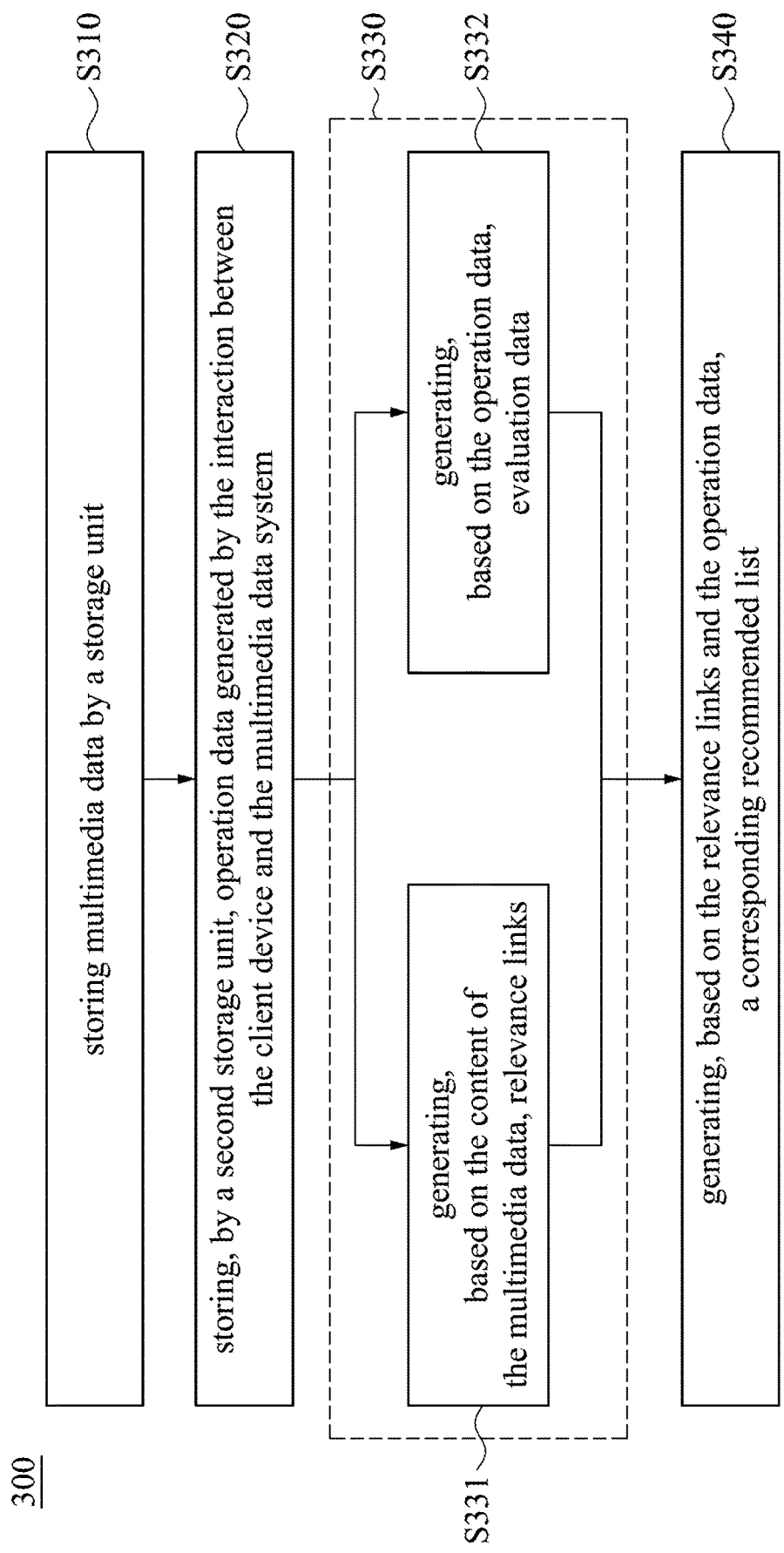
FIG. 2 is a flow chart of a method for managing multimedia data, in accordance with some embodiments of the present disclosure.

Reference is now made to both FIG. 1 and FIG. 2. FIG. 2 is a flow chart of a method 300 for processing multimedia data, in accordance with some embodiments of the present disclosure. The processing method 300 in FIG. 2 includes step S310, step S320, step S330, and step S340. Firstly, in step S310, the multimedia data segments are stored by the first storage unit 142 in the storage device 140. In some embodiments, the multimedia data segments include multimedia data which is not segmented, such as a complete video or an article, or multiple multimedia data segments which are segmented, such as the article paragraphs which are segmented according to the topics.

Then, in step S320, the operation data generated by the interaction of the client device 200 and the multimedia data system 100 are stored by the second storage unit 144 in the storage device 140.

The method for generating the operation data in the multimedia data system 100 is described below. In some embodiments, the generation method of the operation data can be according to the number of times of query in the forum. For example, when the user is watching the multimedia data on the online English learning platform, the platform not only displays the interface of the content of the multimedia data, but also displays the forum corresponding to the multimedia data. The forum provides the user to ask questions or discuss the content. For example, if the user has a query about the content of the video, the user can issue a question in the forum, and mark a time duration of the video to allow the one, who wants to answer the question, knows faster which segment in the video raises the question.

For example, when the user has a question at time 1:00 in the video, the user can query in the forum and mark time 1:00 of the video. When other users watch the video, the question in the forum can be seen at the same time, and other users can leave answers in the area below. In the future, the person who watches the video and has the same question can look up in the forum whether the question has been solved or not.

In some embodiments, the method for generating the operation data can be according to the number of marks. For example, when the user watches the multimedia data segments, the marks can be added in the content. The annotations can be further added in the marks. In addition to the annotations added by the user by their own, through setting, the annotations added by other users can be seen or the marks and the annotations used by the professionals can be applied. For example, when the user watches a video and considers that at time 3:00 is a crucial point, the user can put a mark at time 3:00 in the video and attach an annotation to mark that position as a crucial point. Through setting, other users can see marks and annotations of other users, and the system can also count the marks, which are used most often, for the user to access.

In some embodiments, the method for generating the operation data can be according to the view record. For example, the processor 120 computes a record of the user watching the multimedia data segments, that is, to count the view record. In a statistical result, the proportion of video is the highest, and the proportion of the article is the lowest. It indicates that the user prefers to use videos for learning, has higher acceptance to videos or wants to improve English listening skill, but the user does not prefer to read words or not have to enhance English writing skill. The processor 120 can obtain the favorite learning mode and the topics of the user by analyzing the online learning courses watched by the user. For example, in the user's view record are mostly English travel articles. It indicates that the user is more interested in the travel topic and prefers to read or want to enhance the reading skill. The analysis result can be stored in the second storage unit 144 as the operation data.

In some embodiments, the method of generating the operation data can be an analysis result of the performance of the online test or the response to the question. In other words, the aforementioned operation data include a response to the aforementioned multimedia data segment when the user operates. For example, when the multimedia data segment includes a question questionnaire, the response is "answer". For another example, through the online test, a user can know the own learning result, and the type of online test can be true or false Test, multiple choice question, essay question, writing or oral test and the like. In addition to the score of the online test, the time and the speed of answering are all the parameters for the response analyzing unit 122 in the processor 120 to evaluate the learning result of the user. The processor 120 analyzes the aforementioned parameters to generate an analysis result, and stores the analysis result as the operation data. For example, when the online test is carried out, the analysis result can be the correctness of the answer when the user conducts the online test, and the analysis result can have two results, i.e., correct and wrong.

In some embodiments, the method of generating the operation data can be according to the operation of watching the online video, such as the actual play duration of the multimedia data. When the user watches the English online courses with different difficulty level, different operations can be carried out. For example, when an English learning beginner (e.g., in the primary level of General English Proficiency Test) watches the English online courses with higher difficulty level (e.g., in the medium level of General English Proficiency Test), it takes more time to watch, for example, by repeating a specific portion or pausing the video. The actual play duration can be longer than the duration of the video. The timing unit 124 in the processor 120 can calculate the actual play duration of the user. The second storage unit 144 can store the record and the actual play duration as the operation data. The processor 120 can determine whether the online course which is repeatedly watched is a learning topic in which the user is interested or needs to be reinforced.

For example, the performance of the online test includes a test score or a test duration. The processor 120 can refer to the reference play duration, the reference answering time, and the reference score. The learning level of a user is determined by calculating the play duration of a user when the user is watching the online course or the score and answering time of the online test. When the play duration is longer than the reference play duration, it is determined that the online course is difficult for the user. When the play duration is shorter than the reference play duration, it is determined that the online course is easy for the user. When the answering time is longer than the reference answering time or when the score is lower than the reference score, it is determined that the online test is difficult for the user. When the answering time is shorter than the reference answer time or when the test score is higher than the reference score, the online course is determined to be easy for the user. Therefore, the processor 120 can determine how difficult the current multimedia data segment or online test is for the user by the aforementioned manner of determination. In this embodiment, the property of the multimedia data segment can be the difficulty of the multimedia data segment. The way to set the reference score can be the average score of all the users passing through the test. The way to set the reference answering time can be the average costed time of all the users passing through the test. The ways to set are not limited by the aforementioned implements and can be other ways for setting.

The method for generating the operation data of the present disclosure is not limited thereto. The method for generating the operation data described above is given for an exemplary purpose. All operations conducted by the user through the client device 200 on the multimedia data system 100 are included in the operation data mentioned in the present disclosure. The operation data represents the use habit and behavior of the user, and then the evaluation data is generated by analyzing the operation data. The processor 120 can further obtain the preference or the level of the user by the evaluation data.

In step S330, the analysis and calculation with the multimedia data segments in the first storage unit 142 and the operation data in the second storage unit 144 is performed. In some embodiments, step S330 further includes step S331 and step S332. In step 331, the relevance links are generated for the multimedia data segments in the first storage unit 142. In step 332, based on the operation data stored in the second storage unit 144, the evaluation data is generated.

The method for analyzing the relevance between the content of multimedia data segment in step S330 is introduced below. The contents of the multimedia data segments, taking videos as an example, further include a video subtitle, the content in the forum, a mark on the video and the like. The relevance between the contents of different multimedia data segments can have high similarity because the topic, the subtitle, the course description, or the difficulty level are similar. In addition, taking videos as an example, two videos about two different topics can have associated partial content. For example, the content at time 2:00-3:00 of video A about travel topic has relevance with the content at time 5:00-6:00 of video B about food topic, and the content may probably describe a travel mode and culture of food in the same country. Therefore, different contents of the videos are required to be segmented, and the relevance links between the associated segments are required to be established.

Figure 3:
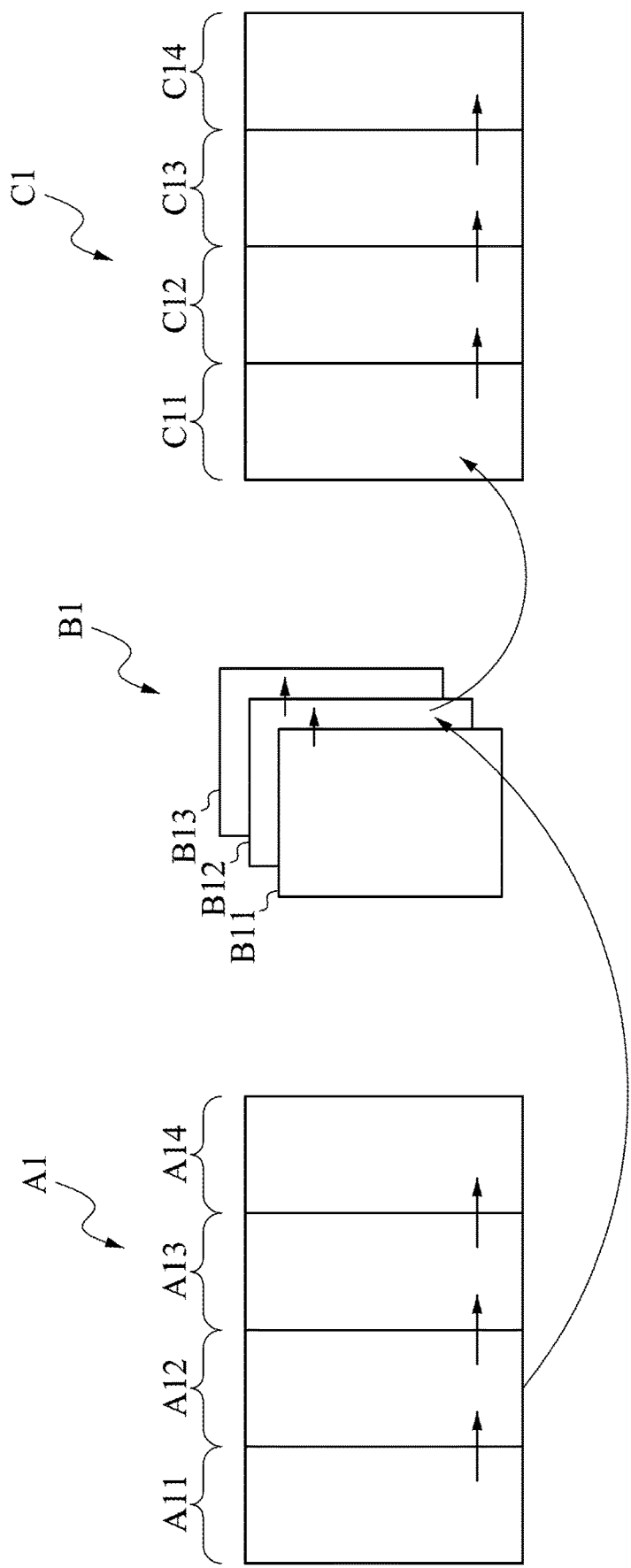
FIG. 3 is a schematic diagram illustrating the relevance of content of multimedia data, in accordance with some embodiments of the present disclosure.

The method in step S331 for establishing the relevance links is described below. Reference is made to FIG. 3. FIG. 3 is a schematic diagram illustrating the relevance of the content of multimedia data, in accordance with some embodiments of the present disclosure. In FIG. 3, the multimedia data A1, the multimedia data B1, the multimedia data C1, and the corresponding segments A11-A14, segments B11-B13, and segments C11-C14 are included. In this embodiment, it is given as an example that the multimedia data A1 is a video, the multimedia data B1 is an article, and the multimedia data C1 is a video. The method for analyzing the relevance between the contents of online courses is described below.

In the multimedia data A1, the processor 120 can first analyze the video content of the multimedia data A1. The multimedia data A1 can be divided into a plurality of unit segments by taking the video content as a reference for segmentation. Division of four segments A11, A12, A13 and A14 is given as an example for illustration. The number of multimedia data segments of the present disclosure is not limited to four. Different number of unit segments can be divided according to actual situations. The segmentation method for analyzing the video content can perform analysis based on the video subtitles, a forum, a video mark and the like in the multimedia data A1, which are manners of obtaining the video content. The way for analyzing segmentation can be to aim at, for example, keywords, such as the beginning or ending sentence, commonly used by the speaker in the video, being used to distinguish different unit segments. In addition to analysis via the processor 120, the segmentation can be performed by the person who produces the multimedia data A1 or the experts with the equivalent knowledge. The processor 120 can sectionalize different segments by the aforementioned marking manner, so that while watching the multimedia data A1, the user can directly switch to a segment wanted to be viewed by clicking on the marks or seeing the annotations. The operation has many conveniences, and the multimedia data of other different types can also be applied to the same marking manner.

In the multimedia data B1, the manner of analyzing the content and the paragraph of the article can be used as a reference for distinguishing different unit paragraphs. Usually, for different paragraphs in the content of the article, two spaces at the beginning of the paragraph can be used as a manner to distinguish different paragraphs. Therefore, the position where the two spaces in the article paragraph are detected can be the beginning of the different unit paragraph. In this embodiment, the division of three segments B11, B12 and B13 is given as an example. The segmentation method for the multimedia data C1 is similar to the one for the multimedia data A1. The division of four segments C11, C12, C13 and C14 is given as an example.

The processor 120 segments each different multimedia data A1, B1 and C1 according to the contents, and then analyzes the relevance between the multimedia data A1, B1 and C1. There can be relevance between the contents of different segments in different multimedia data. In this embodiment, the segment A12 in the multimedia data A1 has relevance with the segment B12 in the multimedia data B1 and the segment C11 in the multimedia data C1. The processor 120 establishes relevance links between the segment A12, the segment B12 and the segment C11, as shown in the curve arrow in FIG. 3. For example, after watching the video content of segment A12, in addition to continuing watching the segment A13 in the preset order, it is suitable to read the article content of the segment B12 and then watch the video content of the segment C11. The article content of the segment B12 can be an article paragraph illustrating the video content of the segment A12, and is one of the knowledge bases of the segment C11. In such a case, it is not necessary, as the traditional way of watching the video, to watch the segments A11, A12, A13 and A14 entirely in the order of the multimedia material A1 and then watch the multimedia data B1.

In some embodiments, the relevance links between the multimedia data segments can also be pre-established when the multimedia data are uploaded. For example, a professional making a video establishes relevance links between the contents with the relevance in different videos after uploading is completed. For example, after uploading a plurality of English teaching videos made by himself, the English teacher establishes the relevance links for the portions with the associated contents in advance.

In some embodiment, the multimedia data system 100 does not segment the multimedia data. The relevance links are generated directly according to the content of the multimedia data A1, the multimedia data B1 and the multimedia data C1.

In step S332, the operation data includes the evaluation data. The processor 120, by analyzing the operation data generated in the step S320 and the difficulty corresponding to each multimedia data segment, further generates the evaluation data corresponding to the current user. The evaluation data includes the level of the multimedia data segment corresponding to the user in order to determine the suitable multimedia data segments for the user. In other words, the processor 120 can determine the level of the user by the evaluation data. For example, the proportion of multimedia data of the primary level of General English Proficiency Test is the statistically highest in the proportion of the multimedia data viewed by the user in the operation data. The processor 120 determines that the level of the user is the primary level of General English Proficiency Test, and generates the corresponding evaluation data assessing that the level of the user is the primary level of General English Proficiency Test. The way of evaluation is not limited to the above and can be other statistical methods and methods of determination.

For example, the method for generating the evaluation data can be according to the result of further evaluating the analysis of the operation data generated by the various methods in the aforementioned embodiments. For instance, the performance of the online test is lower than the average score of the test score of medium level in General English Proficiency Test, and then the evaluation data, indicating that the level of the current user is the primary level of General English Proficiency Test, is generated. The processor 120 can obtain the level of the user by the evaluation data.

In other embodiments, under the condition that the client device 200 and the multimedia data system 100 are connected to store the multimedia data segments, the multimedia data system 100 generates the operation record of the user, and the aforementioned operation record can be stored in the second storage unit 144. The operation record includes the record generated when the user uses the multimedia data segments in the first storage unit 142. The operation record represents the history record of the multimedia data segments used by the user. The result of analyzing the operation record can be used to know the types of the multimedia data segments used by the user or the level of the user. By analyzing the operation record, the processor 120 performs an evaluation of the operation record, and evaluates the preference and the level of the multimedia data segments corresponding to the operation data in order to determine the multimedia data suitable for the user.

Finally, in step S340, based on the relevance links and the operation data in step S330, corresponding recommended list data is generated for the client device 200 to display a recommended list, and, based on the updated relevance links and the operation data, the content of the recommended list is changed. One embodiment is given for illustrative purpose below.

Figure 4:
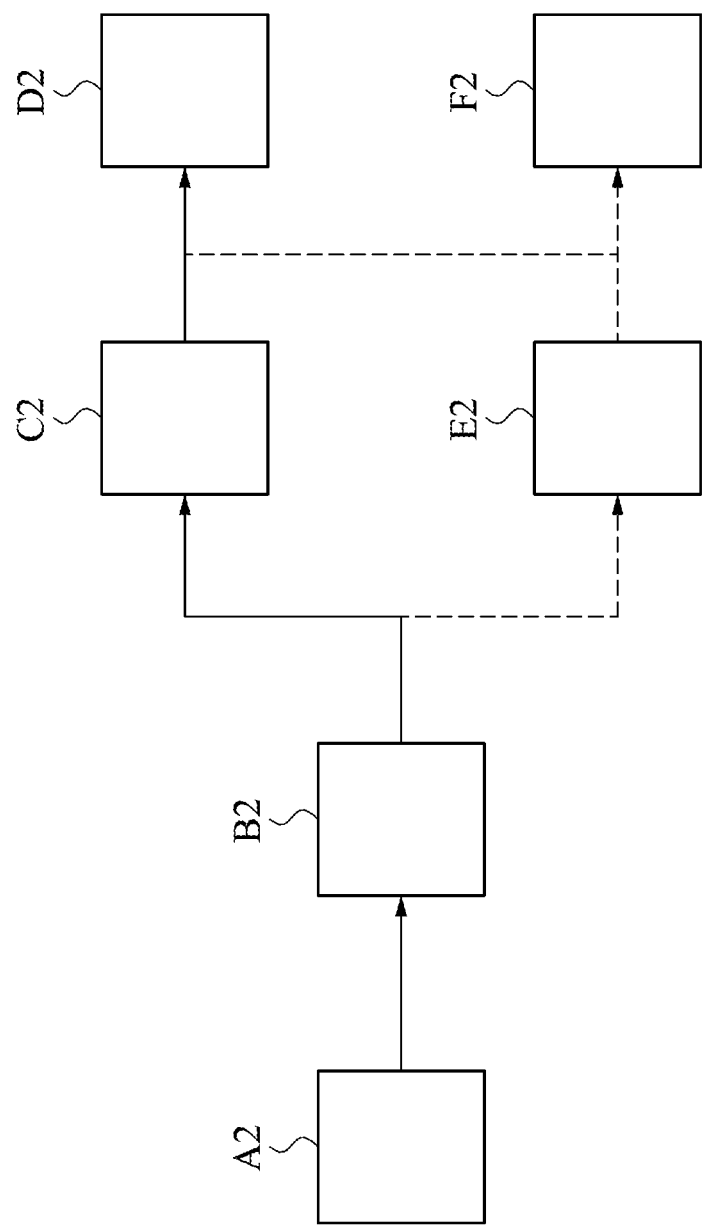
FIG. 4 is a schematic diagram of learning paths of a recommended list, in accordance with some embodiments of the present disclosure.

Reference is made to FIG. 4. FIG. 4 is a schematic diagram of learning paths of a recommended list, in accordance with some embodiments of the present disclosure. The multimedia data A2-F2 are included in FIG. 4. By the aforementioned relevance links and the operation data, the processor 120 generates the corresponding recommended list. In the present embodiment, the initial recommended list includes the multimedia data A2 and B2. After the user views the multimedia data A2 and B2, the corresponding relevance link and the operation data are generated. By the relevance links and the operation data again, the processor determines that among the multimedia data C2 and E2, it is more suitable for the user to view the multimedia data C2. Then the multimedia data C2 is added into the recommended list. Afterward, a determination is made to the multimedia data D2 and F2 again, and the result of the determination is that the multimedia data D2 is more suitable than the multimedia data F2. Therefore, the final learning path is the multimedia data A2, B2, C2 and D2.

For example, the multimedia data A2 and C2 are the course videos of the primary level of General English Proficiency Test, and the multimedia data B2 and E2 are the course videos of the medium level of General English Proficiency Test. During watching the multimedia data A2, the user does not make a pause the video or have no operation of the query in the forum. The score of the online test is higher than the average score. During watching the multimedia data B2, the user pauses the video five times and queries two times in the forum. The score of the online test is lower than the average score, and it takes longer than the average time. The processor 120 generates the operation data of the aforementioned operation. The processor 120 determines that there is relevance between the contents of multimedia data B2, C2 and E2, and generates the relevance link. By the aforementioned operation data, the processor 120 generates the evaluation data indicating that the level of the current user is determined as the primary level of General English Proficiency Test, not as the medium level of General English Proficiency Test, so that the processor 120 changes the learning path from being connected to multimedia data E2 to the multimedia data C2. The situation of the multimedia data D2 and F2 is similar to the above. The processor 120 determines that the multimedia data D2 is more suitable for the current user rather than the multimedia data F2. Through the aforementioned operation, the multimedia data shown on the final recommended list are the multimedia data A2-D2. The learning path recommended for the user is from the multimedia data A2 to the multimedia data D2.

In some embodiments, in addition to changing the sequence of the multimedia data in the recommended list, the content of the recommended list can be changed by adding or removing the multimedia data in the recommended list. For example, in the aforementioned embodiment, after the user watches the multimedia data D2, the processor 120 generates the corresponding evaluation data, based on the operation data generated after the user watches the multimedia data D2, in order to determine that the difficulty of the multimedia data D2 for the current user is easy, so that the other multimedia data, which have relevance with the multimedia data D2 and are more difficult, are added and recommended.

In some embodiments, the storage device 140 further includes an analysis-end database. The analysis-end database is configured to store the result of the change of the recommended list and the learning path and the result instantly after the user uses. The processor 120 further analyzes the recommended list data and the learning path in the analysis-end database and updates the recommended list. Therefore, the data of the recommended list is updated instantly or regularly by the user behavior and the result after using the multimedia data. For example, the processor 120 can set a time interval to update the recommended list, e.g., once per hour. The way to set the time interval is not limited to the above.

In summary, the multimedia data system analyzes the relevance between multimedia data segments, builds relevance links, analyzes operation data between a client device and the multimedia data system to generate evaluation data, generate a recommended list suitable to users, updates the recommended list instantly or regularly along with the user using the multimedia data segments on the recommended list and the usage behavior and saves the result of learning paths, selected by the user, as one of the reference for updating the recommended list in the future.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for recommending multimedia data, comprising:
a storage device, comprising:
a first storage unit configured to store a plurality of multimedia data segments; and
a second storage unit connected to at least one client device through network, and configured to store a plurality of operation data generated by an interaction between the at least one client device and the system, wherein the operation data comprise a score and answering time of an online test; and
a processor coupled to the storage device, and configured to determine a learning level of a user according to the score and the answering time in which a property of each of the multimedia data segments is difficulty,
the processor being configured to calculate a similarity between the plurality of multimedia data segments based on the difficulties to generate a plurality of relevance links between the plurality of multimedia data segments,
the processor being configured to analyze the plurality of operation data in the second storage unit, and being configured to generate, based on the plurality of relevance links and the plurality of operation data, a corresponding recommended list,
wherein the recommended list records the plurality of multimedia data segments matched with the learning level of the user.

2. The system of claim 1, wherein
the processor is further configured to segment content of at least one multimedia data, generate the plurality of multimedia data segments, and generate, based on the plurality of multimedia data segments, the plurality of relevance links between the plurality of multimedia data segments.

3. The system of claim 1, wherein the processor comprises:
a response analyzing unit,
wherein the plurality of operation data comprise at least one response to the plurality of multimedia data segments, and the processor is further configured to perform analyzing to obtain the at least one response corresponding to at least one question in the plurality of multimedia data segments,
wherein the plurality of operation data further comprise analysis results of the processor analyzing the at least one question and the at least one response corresponding to the plurality of multimedia data segments.

4. The system of claim 1, wherein the processor comprises:
a timing unit, the processor is further configured to calculate a play duration of the plurality of multimedia data segments, wherein the plurality of operation data comprise the play duration of the plurality of multimedia data segments.

5. The system of claim 4,
wherein, the plurality of operation data are updated based on the property.

6. The system of claim 5, wherein
the processor is further configured to change, based on a plurality of updated operation data and the plurality of relevance links, content of the recommended list which is provided to the at least one client device.

7. A method for recommending multimedia data, comprising:
storing, by a first storage unit, a plurality of multimedia data segments;
storing, by a second storage unit, operation data generated by an interaction between at least one client device and a multimedia data system, wherein the operation data comprise a score and answering time of an online test;
determine a learning level of a user according to the score and the answering time in which a property of each of the multimedia data segments is difficulty;
calculating a similarity between the plurality of multimedia data segments based on the difficulties to generate a plurality of relevance links between the plurality of multimedia data segments; and
analyzing the operation data in the second storage unit, and generating, based on the plurality of relevance links and the operation data, a corresponding recommended list,
wherein the recommended list records the plurality of multimedia data segments matched with the learning level of the user.

8. The method of claim 7, further comprising:
segmenting content of at least one multimedia data, generating the plurality of multimedia data segments, and generating, based on the plurality of multimedia data segments, the plurality of relevance links between the plurality of multimedia data segments.

9. The method of claim 7, wherein the operation of analyzing the operation data in the second storage unit, and generating, based on the plurality of relevance links and the corresponding recommended list generated from the operation data comprises:
analyzing at least one response, in the plurality of multimedia data segments, corresponding to at least one question in order to obtain an analysis result.

10. The method of claim 7, wherein the operation of analyzing the operation data in the second storage unit, and generating, based on the plurality of relevance links and the corresponding recommended list generated from the operation data comprises:
calculating a play duration of the plurality of multimedia data segments.

11. The method of claim 10, further comprising: updating, based on the properties corresponding to the plurality of multimedia data segments, the operation data.

12. The method of claim 11, the operation of analyzing the operation data in the second storage unit, and generating, based on the plurality of relevance links and the corresponding recommended list generated from the operation data comprises:
after generating the recommended list, changing, based on updated operation data and the plurality of relevance links, content of the recommended list which is provided to the at least one client device.

* * * * *